(12) United States Patent
Hirai et al.

(10) Patent No.: US 6,397,022 B2
(45) Date of Patent: May 28, 2002

(54) IMAGE FORMING APPARATUS

(75) Inventors: Takashi Hirai; Nobuyuki Kutoh; Kenjiro Hirayama; Kazuyuki Katoh; Chikashi Kobayashi; Masanori Kagino; Masayuki Kaji, all of Ebina (JP)

(73) Assignee: Fuji Xerox Co. Ltd., Tokyo (JP)

( * ) Notice: Subject to any disclaimer, the term of this patent is extended or adjusted under 35 U.S.C. 154(b) by 0 days.

(21) Appl. No.: 09/726,443

(22) Filed: Dec. 1, 2000

(30) Foreign Application Priority Data

Jan. 17, 2000 (JP) .......................... 2000-007977

(51) Int. Cl.[7] .............................................. G03G 15/00
(52) U.S. Cl. .................... 399/81; 345/810; 358/474; 399/363
(58) Field of Search .......................... 399/81, 411, 75, 399/363; 358/1.1, 474; 345/810, 845

(56) References Cited

U.S. PATENT DOCUMENTS 5,721,621 A * 2/1998 Komaki et al.
5,740,496 A * 4/1998 Kawabuchi et al. .......... 399/81
6,075,925 A * 6/2000 Downing et al. ........... 345/810

FOREIGN PATENT DOCUMENTS

JP 63-83737 * 4/1988
JP 1-195757 * 8/1989

* cited by examiner

Primary Examiner—Susan S. Y. Lee
(74) Attorney, Agent, or Firm—Oliff & Berridge, PLC

(57) ABSTRACT

An image forming apparatus includes an image reading part for performing a reading operation of reading an image, an image output part for performing an output operation of outputting the image read by the image reading part on a sheet, and a stopping section for stopping only one of the reading operation of the image reading part and the output operation of the image output part.

7 Claims, 4 Drawing Sheets

IMAGE FORMING APPARATUS

BACKGROUND OF THE INVENTION

1. Field of the Invention

The present invention relates to an image forming apparatus having an image reading part for reading an image and an image output part for outputting the read-out image on a sheet.

2. Description of the Related Art

Conventional image forming apparatuses having an image reading part for reading an image and an image output part for outputting the read-out image on a sheet are configured in such a manner that both of the image reading part and the image output part stop their operations if a user makes a stop instruction by manipulating a control panel or the like while the image reading part and the image output part are operating.

However, the above image forming apparatuses have the following problems. If a user makes an operation stop instruction while images of an original document of plural pages, for example, are being read and the images are being output on sheets in order to, for example, replace part of the original document that has not been read by the image reading part, not only the image reading operation but also the image output operation is stopped though the latter operation need not be stopped. The image output operation is restarted when the user makes a printing start instruction after replacing the part of the original document, However, this results in increase in the working time to completion of the copying.

Similarly, in a case where it is desired that a document reading operation be completed whereas an image output operation be stopped because, for example, the state of images that are output on sheets is not good, not only the image output operation but also the image reading operation is stopped when a user makes an operation stop instruction though the user does not want to stop the image reading operation. This also results in increase in the working time to completion of the copying.

SUMMARY OF THE INVENTION

The present invention has been made in view of the above circumstances and provides an image forming apparatus which can shorten the time required for the entire printing operation when it has become necessary to stop an image reading operation or an image output operation.

Specifically, the invention provides an image forming apparatus including: an image reading part for performing a reading operation of reading an image; an image output part for performing an output operation of outputting the image read by the image reading part on a sheet; and a stopping section for stopping only one of the reading operation of the image reading part and the output operation of the image output part.

In the above image forming apparatus, the stopping section can stop only one of the reading operation of the image reading part and the output operation of the image output part. Since the other operation is continued even if the one operation is stopped, the time required for the entire printing operation can be shortened.

It is preferable that the above image forming apparatus further includes a key display part for displaying, on a prescribed screen, a reading stop key for stopping the reading operation and an output stop key for stopping the output operation, and that the stopping section stops the reading operation when the reading stop key is pushed and stop the output operation when the output stop key is pushed. With this configuration, a user of the image forming apparatus can stop only the reading operation by pushing the reading stop key that is displayed on the screen and can stop only the output operation by pushing the output stop key.

It is preferable that the key display part can display, on the screen, a common stop key for stopping both of the reading operation and the output operation. With this configuration, the user can stop both of the reading operation and the output operation by pushing the common stop key. Therefore, it is not necessary for the user to perform manipulations of pushing both of the reading stop key and the output stop key.

The image forming apparatus may be configured in such a manner that the key display part can display, on the screen, a display instruction key for causing the reading stop key and the output stop key to be displayed on the screen, and that the key display part displays the reading stop key and the output stop key on the screen when the display instruction key is pushed.

It is preferable that when the display instruction key is pushed in a state that one of the reading operation and the output operation is stopped, the key display part display neither the reading stop key nor the output stop key on the screen and the stopping section stops the other of the reading operation and the output operation that is not stopped. This configuration dispenses with the time that would otherwise be necessary for the user to push a key corresponding to the operation that is not stopped.

It is preferable that the image forming apparatus further includes a reading stop instruction part that enables input of an instruction to stop the reading operation and an output stop instruction part that enables input of an instruction to stop the output operation, and that the stopping section stops the reading operation when the reading stop instruction part is manipulated and stop the output operation when the output stop instruction part is manipulated. With this configuration, the user can stop the reading operation of the image reading part by manipulating the reading stop instruction part and can stop the output operation of the image output part by manipulating the output stop instruction part.

Further, it is preferable that the image forming apparatus further includes a common stop instruction part that enables input of an instruction to stop both of the reading operation and the output operation. With this configuration, the user can stop both of the reading operation and the output operation by manipulating the common stop instruction part. Therefore, it is not necessary for the user to perform manipulations of pushing both of the read stop instruction part and the output stop instruction part.

BRIEF DESCRIPTION OF THE DRAWINGS

A preferred embodiment of the present invention will be described in detail based on the following figures, wherein.

DETAILED DESCRIPTION OF THE PREFERRED EMBODIMENT

An image forming apparatus according to a preferred embodiment of the present invention will be hereinafter described in detail with reference to the accompanying drawings. The same components will be given the same reference symbols and redundant descriptions therefore will be omitted.

Figure 1:
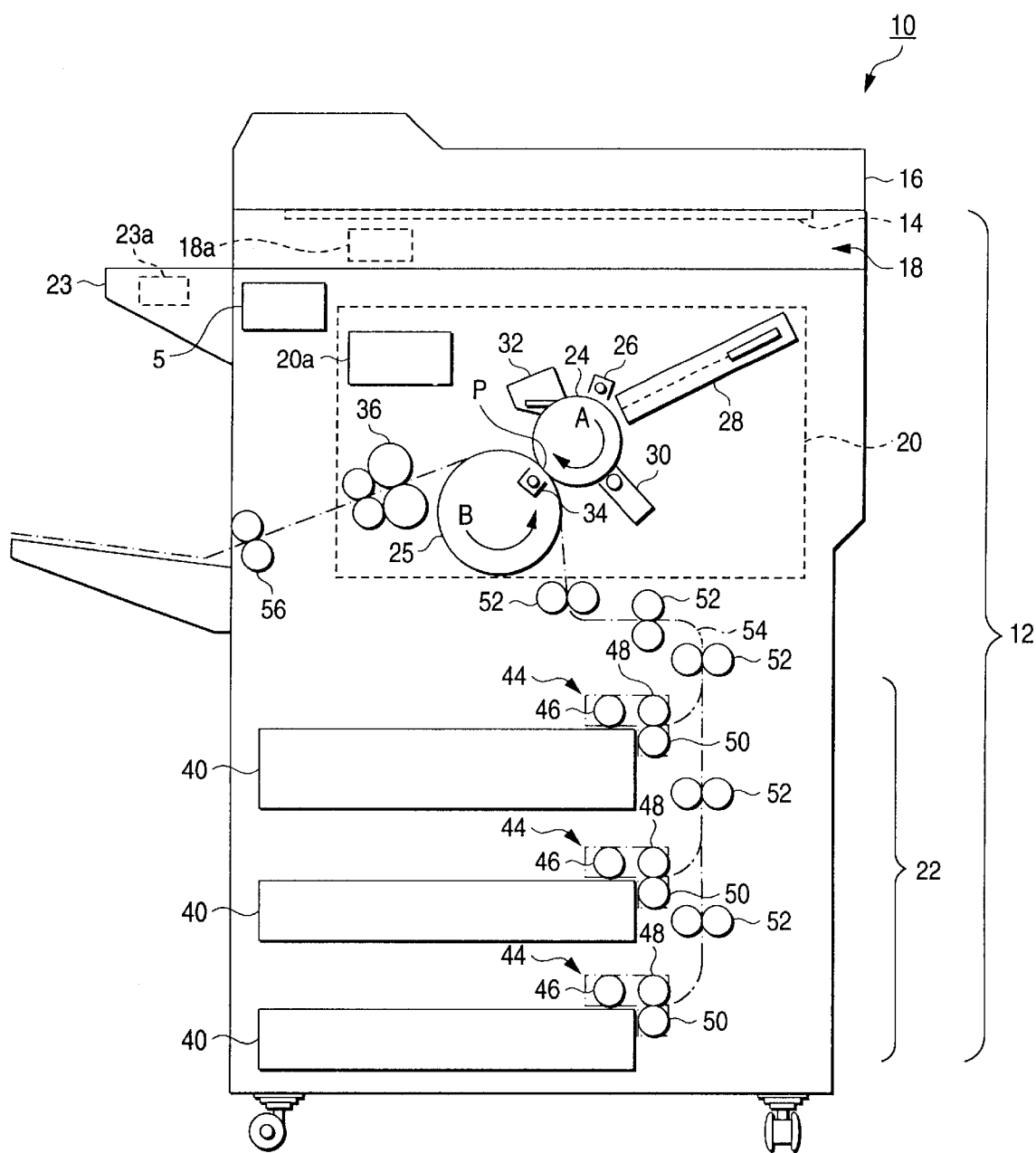
FIG. 1 shows a general configuration of an image forming apparatus according to the present invention.

FIG. 1 shows a general configuration of an image forming apparatus 10 according to the embodiment. The image forming apparatus 10 is mainly composed of a main body 12 and an automatic document feeder 16 capable of opening and closing that is so provided as to cover a copy glass plate 14 that is provided at the top of the main body 12.

The main body 12 is provided inside with an image reading part 18 for reading and converting into image data the image of a moving document that has been transported and placed on the copy glass plate 14 by the automatic document feeder 16 or a fixed document that was placed on the copy glass plate 14 by opening the automatic document feeder 16; an image output part 20 for forming a visible image, that is, outputting an image, on a sheet based on the image data that is supplied from an image reading controller 18a that is incorporated in the image reading part 18; a sheet feeding part 22 for supplying sheets to the image output part 20; and a main controller 5 for controlling the entire image forming apparatus 10.

The main body 12 is provided, at a position close to the top, with a touch panel 23 that allows input of information such as a sheet size, an image density, etc. and displays such information. Provided with a touch panel controller 23a, the touch panel 23 displays a sheet size setting key etc. under the control of the touch panel controller 23a.

Figure 2:
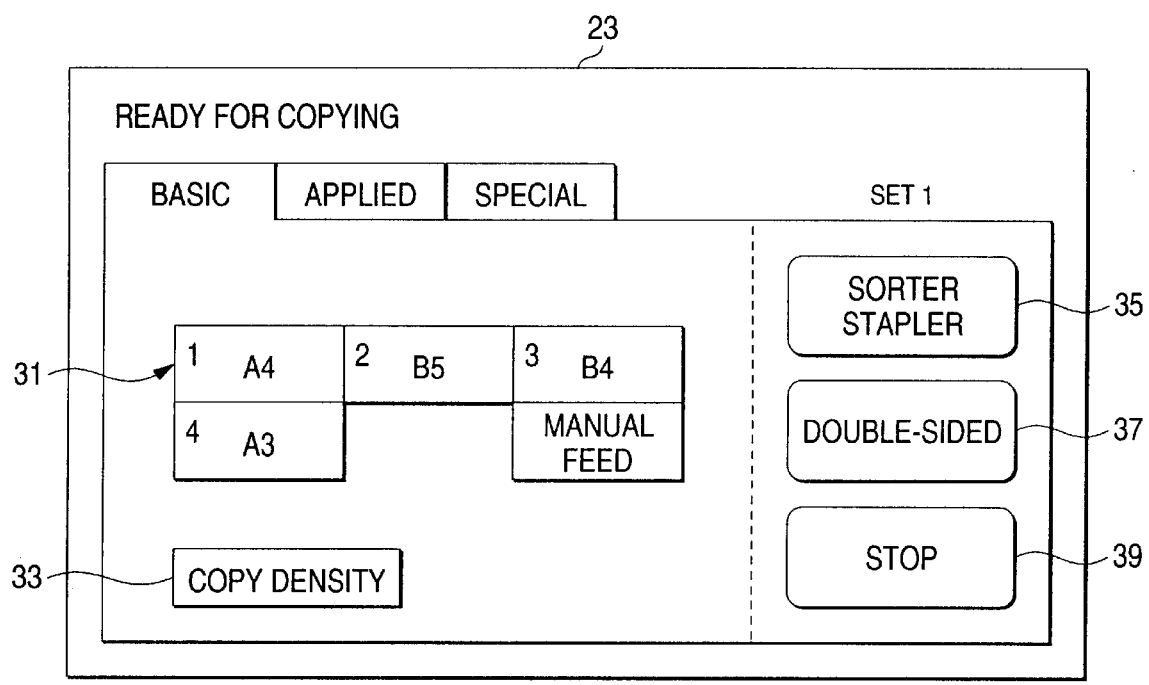
FIG. 2 shows a touch panel.

The touch panel 23 will now be described with reference to FIG. 2. As shown in FIG. 2, the touch panel 23 displays a sheet size setting key 31 for setting a sheet size, a density adjustment key 33 for adjusting the copy density, a sort key 35 for determining whether to perform sorting, a double-sided printing setting key 37 for effecting double-sided printing; and a stop key (display instruction key) 39 that is a feature of the embodiment. When one of the above keys is pushed, the touch panel controller 23a performs proper processing.

As shown in FIG. 1, the image output part 20 incorporates an image output controller 20a. The image output controller 20a controls an image output operation of the image output part 20 based on a control command that is supplied from the main controller 5 and image data that is supplied from the image reading part 18. The image output part 20 is provided with a photoreceptor drum 24 that rotates in direction A (clockwise in FIG. 1) and a transfer roller 25 that rotates in direction B (counterclockwise) in such a manner that they are in close proximity to each other at a prescribed position (hereinafter referred to as "transfer position P").

The photoreceptor drum 24 is surrounded by a charging device 26 for charging the photoreceptor drum 24 uniformly, a writing device 28 for forming an electrostatic latent image on the surface of the photoreceptor drum 24 by illuminating it with a laser beam based on image data that is supplied from the image reading part 18, and a developing device 30 for forming a developed image by visualizing, with toner, the electrostatic latent image formed on the photoreceptor drum 24 in such a manner that those devices are arranged in the circumferential direction. Further, a cleaning device 32 for removing toner that remains on the photoreceptor drum 24 after a transfer is provided on the other side of the transfer position P.

A transfer device 34 for transferring the developed toner image formed on the surface of the photoreceptor drum 24 to a sheet that has been supplied from the sheet feeding part 22 and is transported between the photoreceptor drum 24 and the transfer roller 25 is provided inside the transfer roller 25 at such a position as to be opposed to the transfer position P.

The image output part 20 is also provided with a fusing device 36 for fusing, onto the sheet, the image that has been transferred to the sheet by the transfer device 34.

The sheet feeding part 22, which occupies a bottom portion of the main body 12, is provided with three sheet feeding trays 40 and sheet feeding mechanisms 44 provided for the respective sheet feeding trays 40. The sheet feeding trays 40, which serve to accommodate sheets of respective sizes or types in a stacked manner, are mounted detachably in the main body 12. Sheets are output from one of the sheet feeding trays 40. Each sheet feeding mechanism 44 is composed of a pickup roller 46 for sequentially outputting sheets while being in contact with the top sheet on the sheet feeding tray 40 and a pair of rollers, that is, a feed roller 48 and a retard roller 50, for receiving a sheet that is supplied from the pickup roller 46 and outputting it toward the image output part 20 while preventing duplicated feeds of sheets. The pickup roller 46 and the feed roller 48 are rotated being driven by a motor (not shown). The retard roller 50 that is paired with the feed roller 48 rotates following the rotation of the feed roller 48.

A sheet transport path 54 is formed from each sheet feeding tray 40 to the image output part 20 by several pairs of guide rollers 52. Therefore, sheets that are output from each sheet feeding tray 40 are sequentially transported to the transfer position P and then to the fusing device 36 along the sheet transport path 54 and then ejected from the apparatus 10 via ejection rollers 56 that are disposed downstream of the fusing device 36.

Figure 3:
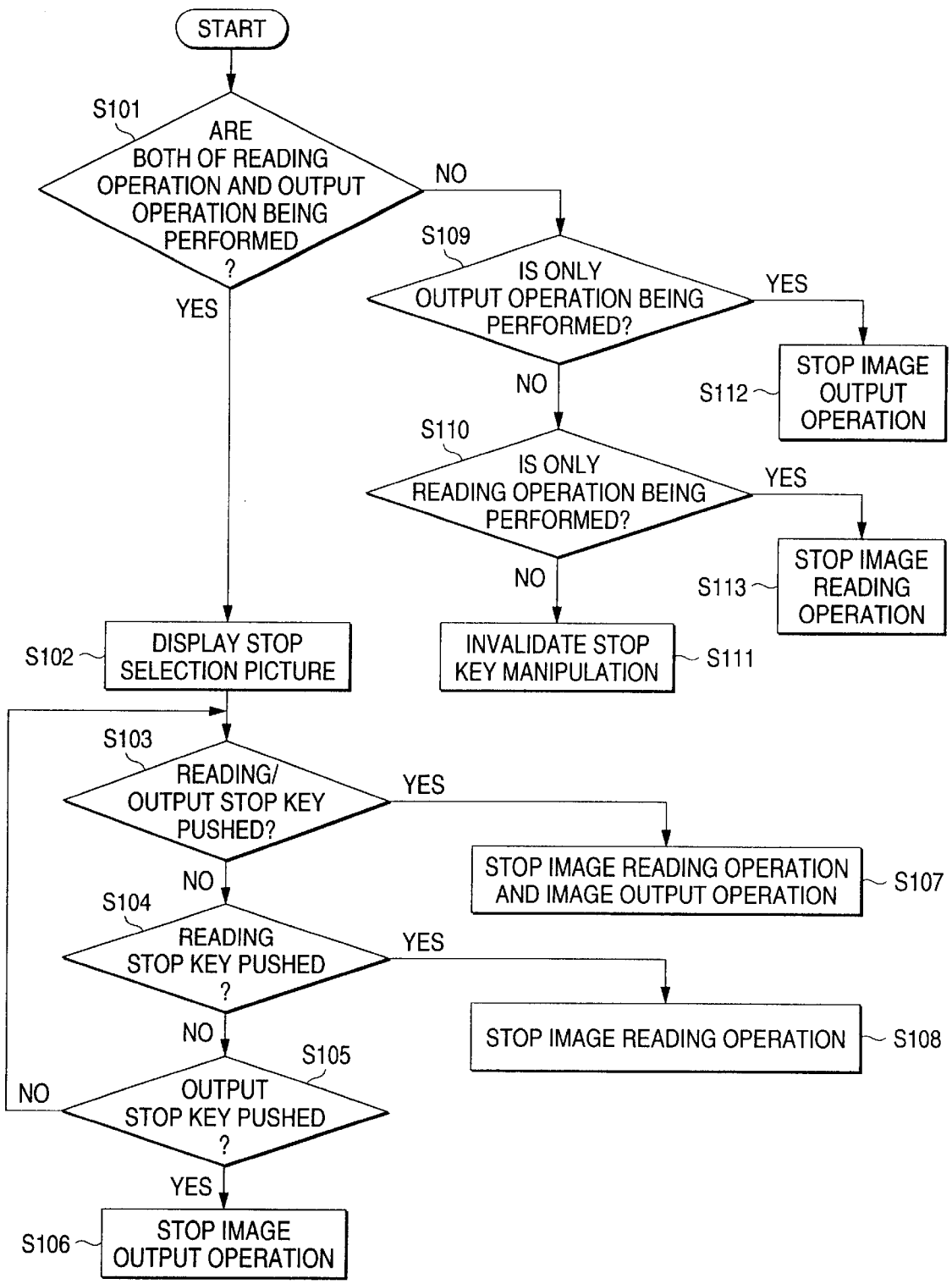
FIG. 3 is a flowchart showing a control operation of a main controller.

The configuration of the image forming apparatus 10 according to the embodiment has been described above. Next, a control operation of the main controller 5 of the image forming apparatus 10 that is performed when the stop key on the touch panel 23 is pushed will be described with reference to a flowchart of FIG. 3.

When a user has pushed the stop key 39 (see FIG. 2) on the touch panel 23, at step S101 the main controller 5 judges whether the image reading part 18 is performing a reading operation and the image output part 20 is performing an output operation. Whether the image reading part 18 is performing a reading operation is judged based on information that is supplied from the image reading controller 18a, and whether the image output part 20 is performing an output operation is judged based on information that is supplied from the image output controller 20a. Incidentally, when receiving, from the image reading controller 18a, information of such a kind that a sheet jam occurred in the automatic document feeder 16, the main controller 5 does not stop the operation of the image output part 20 and transmits a stop command only to the image reading controller 18a. When receiving, from the image output controller 20a, information of such a kind that a sheet jam occurred in the image output part 20, the main controller 5 does not stop the operation of the image reading part 18 and transmits a stop command only to the image output controller 20a. Therefore, in this embodiment, there may occur a case that one of the reading operation and the output operation is stopped at a time point when the user has pushed the stop key 39.

If both of the reading operation and the output operation are going on, the main controller 5 transmits a stop selection picture display command to the touch panel controller 23a.

Upon reception of this command, at step S102 the touch panel controller 23a displays a stop selection picture on the touch panel 23.

Figure 4:
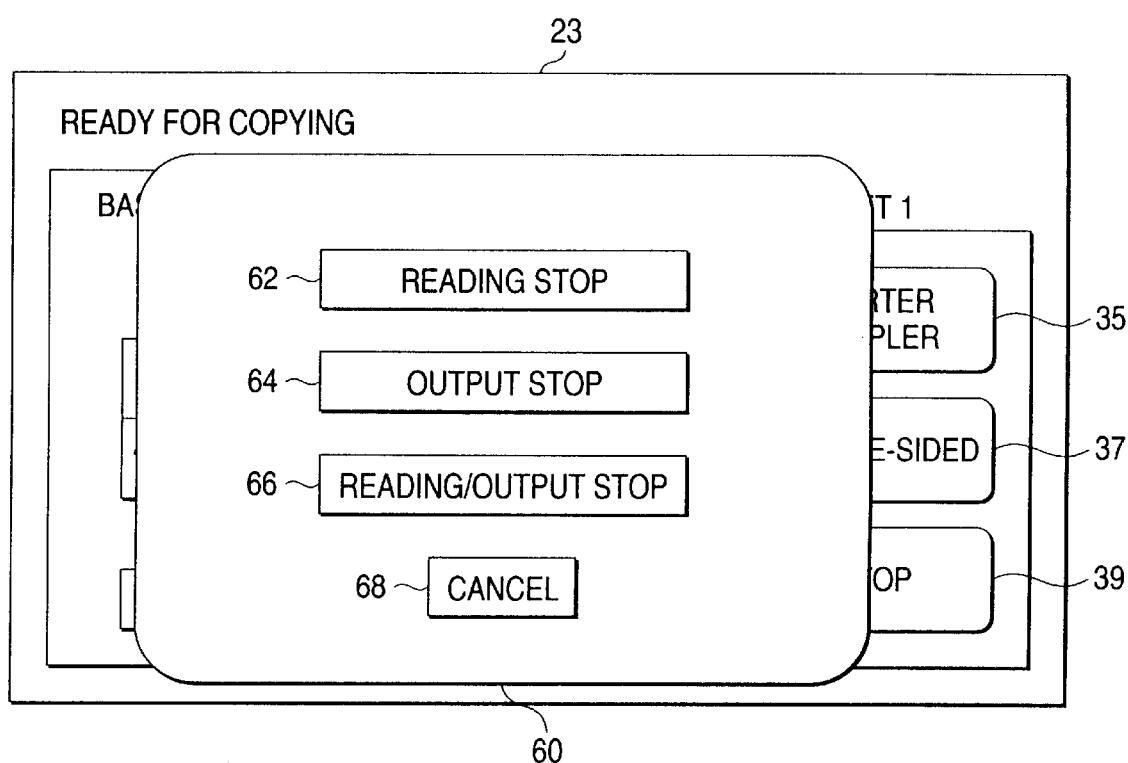
FIG. 4 shows a state that a stop selection picture is displayed on the touch panel.

FIG. 4 shows a state that a stop selection picture 60 is displayed on the touch panel 23. As shown in 4, a reading stop key 62 for stopping a reading operation of the image reading part 18, an output stop key 64 for stopping an output operation of the image output part 20, a reading/output stop key (common stop key) 66 for stopping both of a reading operation and an output operation, and a cancel key 68 for deleting the stop selection picture 60 without stopping both of a reading operation and an output operation are displayed in the stop selection picture 60. The touch panel controller 23a plays a role of a key display part for displaying the reading stop key 62, the output stop key 64, and the reading/output stop key 66 on the display of the touch panel 23.

If the user does not push the reading/output stop key 66 (step S103) and pushes the reading stop key 62 (step S104) in order to, for example, replace part of the original document that is set in the automatic document feeder 16, the process goes to step S108, where the main controller 5 serves as a stopping section and stops the reading operation of the image reading part 18. In this case, the output operation of the image output part 20 is not stopped and the image output part 20 continues to output images on sheets based on image data that has been received before the reading operation of the image reading part 18 is stopped even while, for example, the user replaces the part of the document that is set in the automatic document feeder 16. Therefore, the image forming apparatus 10 of this embodiment can make the time required for the entire printing operation shorter than image forming apparatuses in which an output operation of the image output part 20 is stopped when a reading operation of the image reading part 18 is stopped.

On the other hand, if the user pushes the output stop key 64 (step S105) because, for example, the density of images that have been output on sheets is not good, the process goes to step S106, where the main controller 5 serves as the stopping section and stops the output operation of the image output part 20. In this case, the reading operation of the image reading part 18 is not stopped and the image reading part 18 continues to read the image of the document that is set in the automatic document feeder 16 even while, for example, the user performs a density adjustment by manipulating the density adjustment key 33. Therefore, the image forming apparatus 10 of this embodiment can make the time required for the entire printing operation shorter than image forming apparatuses in which a reading operation of the image reading part 18 is stopped when an output operation of the image output part 20 is stopped.

If it is judged at step S103 that the reading/output stop key 66 has been pushed, the process goes to step S107, where the main controller 5 stops the reading operation of the image reading part 18 and the output operation of the image output part 20. Providing, in this manner, the key for stopping both of a reading operation and an output operation makes it unnecessary for a user to perform manipulations of pushing both of the reading stop key 62 and the output stop key 64.

On the other hand, if it is judged at step S101 that at least one of the reading operation of the image reading part 18 and the output operation of the image output part 20 is stopped, the process goes to step S109, where the main controller 5 judges whether only the output operation of the image output part 20 is being performed. If it is judged that only the output operation is being performed and the reading operation is stopped, the process goes to step S112, where the main controller 5 stops the output operation of the image output part 20 without causing display of the stop selection picture 60. This makes it unnecessary for the user to perform a manipulation of pushing the output stop key 64 for stopping an output operation.

If it is judge at step S109 that the output operation is stopped, at step S110 the main controller 5 judges whether only the reading operation is being performed. If it is judged that only the reading operation is being performed, the process goes to step S113, where the main controller 5 stops the reading operation of the image reading part without causing display of the stop selection picture 60. This makes it unnecessary for the user to perform a manipulation of pushing the reading stop key 62 for stopping a reading operation. On the other hand, if it is judged at step S110 that the reading operation is stopped, the process goes to step S111, where the main controller 5 invalidates the manipulation on the stop key 39 and does not cause display of the stop selection picture 60.

Next, modifications of the image forming apparatus according to the embodiment will be described. In the above embodiment, a reading operation of the image reading part 18, an output operation of the image output part 20, or both of a reading operation and an output operation are stopped when the reading stop key 62, the output stop key 64, or the reading/output stop key 66 that is displayed on the display of the touch panel 23 is pushed. However, the image forming apparatus may be so configured that a reading operation, an output operation, or both operations are stopped when a reading stop instruction button (reading stop instruction part), an output stop instruction button (output stop instruction part), or a reading/output stop instruction button (common stop instruction part) that is provided in advance is depressed instead of pushing of a displayed key.

Although the invention has been described above in a specific manner in the form of the embodiment, the invention is not limited to the embodiment. For example, it is not always necessary to provide the common stop key for stopping both of a reading operation and an output operation.

As described above, in the image forming apparatus according to the invention, the stopping section makes it possible to stop only one of a reading operation of the image reading part and an output operation of the image output part. Since the other operation continues even if the one operation is stopped, the time required for the entire printing operation can be shortened.

The entire disclosure of Japanese Patent Application No. 2000-007977 filed on Jan. 17, 2000 including specification, claims, drawings and abstract is incorporated herein by reference in its entirety.

What is claimed is:

1. An image forming apparatus comprising:
   an image reading part that performs a reading operation of reading an image;
   an image output part that performs an output operation of outputting the image read by the image reading part on a sheet; and
   a stopping section that stops only one of the reading operation of the image reading part and the output operation of the image output part.

2. The image forming apparatus according to claim 1, further comprising a key display part that displays, on a prescribed screen, a reading stop key for stopping the reading operation and an output stop key for stopping the output operation, wherein the stopping section stops the reading operation when the reading stop key is pushed and stops the output operation when the output stop key is pushed.

3. The image forming apparatus according to claim 2, wherein the key display part can display, on the screen, a common stop key for stopping both of the reading operation and the output operation.

4. The image forming apparatus according to claim 2, wherein the key display part can display, on the screen, a display instruction key for causing the reading stop key and the output stop key to be displayed on the screen, wherein the key display part displays the reading stop key and the output stop key on the screen when the display instruction key is pushed.

5. The image forming apparatus according to claim 4, wherein when the display instruction key is pushed in a state that one of the reading operation and the output operation is stopped, the key display part displays neither the reading stop key nor the output stop key on the screen and the stopping section stops the other of the reading operation and the output operation that has not been stopped.

6. The image forming apparatus according to claim 1, further comprising:

a reading stop instruction part that enables input of an instruction to stop the reading operation; and an output stop instruction part that enables input of an instruction to stop the output operation, wherein the stopping section stops the reading operation when the reading stop instruction part is manipulated and stops the output operation when the output stop instruction part is manipulated.

7. The image forming apparatus according to claim 6, further comprising a common stop instruction part that enables input of an instruction to stop both of the reading operation and the output operation.

* * * * *